(12) United States Patent
Paratey et al.

(10) Patent No.: US 10,705,859 B2
(45) Date of Patent: Jul. 7, 2020

(54) ELECTRONIC DISPLAYS WITH CUSTOMIZED CONTENT

(71) Applicant: Facebook, Inc., Menlo Park, CA (US)

(72) Inventors: Pravin Paratey, Greenford (GB); Aliasgar Mumtaz Husain, Milpitas, CA (US)

(73) Assignee: Facebook, Inc., Menlo Park, CA (US)

( * ) Notice: Subject to any disclaimer, the term of this patent is extended or adjusted under 35 U.S.C. 154(b) by 220 days.

(21) Appl. No.: 15/391,562

(22) Filed: Dec. 27, 2016

(65) Prior Publication Data
US 2018/0181412 A1 Jun. 28, 2018

(51) Int. Cl.
*G06Q 30/02* (2012.01)
*H04N 21/414* (2011.01)
*H04N 21/41* (2011.01)
*H04N 21/81* (2011.01)
*G06F 9/451* (2018.01)
*G06F 3/01* (2006.01)
*G06F 8/38* (2018.01)
*G06F 9/445* (2018.01)

(52) U.S. Cl.
CPC ............ *G06F 9/451* (2018.02); *G06F 3/011* (2013.01); *G06F 3/014* (2013.01); *G06F 8/38* (2013.01); *G06F 9/4451* (2013.01); *G06Q 30/0255* (2013.01)

(58) Field of Classification Search
None
See application file for complete search history.

(56) References Cited

U.S. PATENT DOCUMENTS

| | | | | |
|---|---|---|---|---|
| 8,412,577 B2* | 4/2013 | Rodriguez | ............ | G06F 3/011 |
| | | | | 382/100 |
| 8,897,707 B2* | 11/2014 | Faith | .............. | G06Q 30/0201 |
| | | | | 345/156 |
| 2002/0152136 A1* | 10/2002 | Hill | ............... | G06Q 30/02 |
| | | | | 705/14.73 |
| 2011/0239142 A1* | 9/2011 | Steeves | ............ | G06F 3/14 |
| | | | | 715/764 |
| 2011/0288913 A1* | 11/2011 | Waylonis | ........... | G06Q 30/02 |
| | | | | 705/14.4 |
| 2013/0055089 A1* | 2/2013 | Gundotra | ........... | G06Q 10/00 |
| | | | | 715/733 |
| 2014/0222579 A1* | 8/2014 | Kobori | ........... | G06Q 30/0251 |
| | | | | 705/14.64 |
| 2016/0180392 A1* | 6/2016 | Liu | ............... | G06Q 30/0255 |
| | | | | 705/14.53 |

* cited by examiner

*Primary Examiner* — Nhat Huy T Nguyen
(74) *Attorney, Agent, or Firm* — Baker & Hostetler LLP

(57) ABSTRACT

An online system customizes content items to be displayed on electronic displays. The electronic displays may be located at a venue with a large amount of foot traffic from users such as a park, airport, restaurant, shopping center, or airport. The system receives information from an electronic display describing users in vicinity of, or interacting with, the electronic display. For instance, the electronic display receives information from client devices of the users or by using sensors such as a camera that captures images of the users. Additionally, the system may receive interaction data generated by a touchscreen device of the electronic display. Based on the received information, the online system can select content items that are customized based on the interests of the users. The online system can also provide customized content items for display on a user's client device based on the user's interaction with an electronic display.

20 Claims, 8 Drawing Sheets

ELECTRONIC DISPLAYS WITH CUSTOMIZED CONTENT

BACKGROUND

This disclosure generally relates to providing content for electronic displays and in particularly to customizing content items based on interactions of particular users with the electronic displays.

An online system typically has access to large amounts of information describing actions performed by users that may be of interest to other users of the online system. The online system allows its users to connect to and communicate with other users. Users may create user profiles on the online system that are tied to their identities and include information about the users, such as interests and demographic information. Because of the increasing popularity of these types of online systems and the increasing amount of user-specific information maintained by such online systems, an online system provides an ideal forum to increase awareness about content items to online system users. The online system further sends content items to users such as news feed stories including photos, videos, and the like.

Billboards may be in the form of printed media, for example, a poster or sign, or electronic displays that are used to display content items. Electronic displays located in areas with a large volume of vehicle traffic such as busy freeways or with a large volume of foot traffic such as shopping centers or airports can display content items to a large audience of users. Existing electronic displays may not show content items that are customized to particular users of a large audience. For example, an electronic display at a movie theater includes a poster for an action genre movie. However, some people who view the electronic display may not be interested in action movies, but instead prefer movies of other genres.

SUMMARY

An online system customizes content items to be displayed on electronic displays such as billboards for one or more users of the online system. The electronic displays may be located at a venue with a large amount of foot traffic from users such as a park, airport, restaurant, shopping center, or airport. The online system receives information from an electronic display describing users in vicinity of, or interacting with, the electronic display. For instance, the electronic display receives information from client devices of the users or by using sensors such as a camera that captures images of the users. Additionally, the online system may receive interaction data (e.g., finger or hand gestures performed by a user) generated by a touchscreen device of the electronic display. Based on the received information, the online system can select content items that are customized based on the interests of the users, for example, by using information from user accounts of the users on the online system. The online system can also provide customized content items for display on a user's client device based on the user's interaction with an electronic display.

In some embodiments, the online system provides content items for display on an electronic display that are customized to a group of users in vicinity of the electronic display. Further, the online system may customize content items displayed over time and over multiple electronic displays, for example, electronic displays located throughout different stores of a mall, or different exhibits of a park or museum. Based on a user's previous interaction with a content item displayed on an electronic display or client device, the online system may customize a subsequent content item for display to the user, which provides a more engaging user experience with the presentation of content that is more likely to interest the user.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

I. System Overview

Figure 1A:
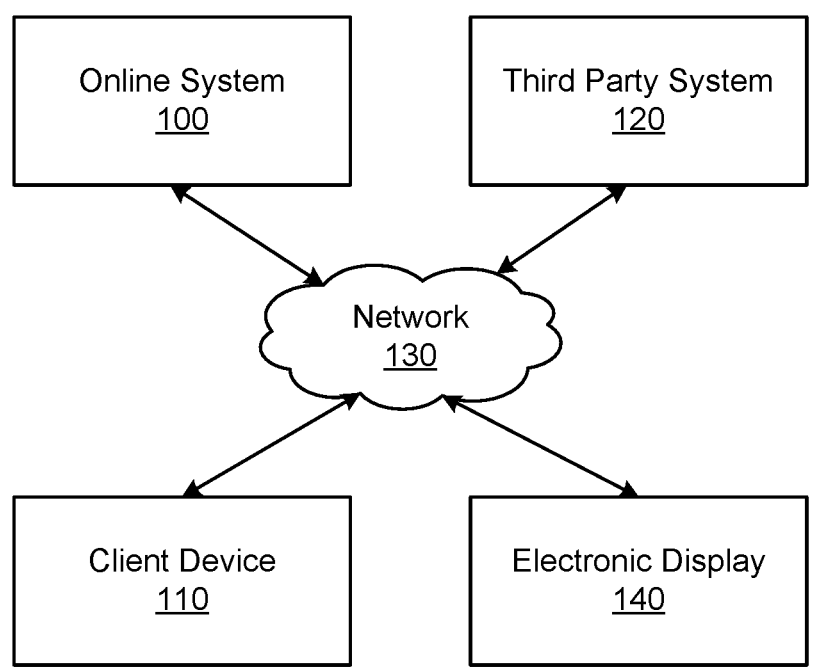
FIG. 1A is a diagram of a system environment for customizing content for electronic displays according to one embodiment.

FIG. 1A is a diagram of a system environment for customizing content for electronic displays according to one embodiment. The system environment includes an online system 100, one or more client devices 110, one or more third party systems 120, and one or more electronic displays 140, connected to each other via a network 130. In other embodiments, different and/or additional entities can be included in the system environment.

The online system 100 allows users of the online system 100 to communicate or otherwise interact with each other and access content. The online system 100 receives information about the users, for example, user profile information and information about actions performed by users on the online system 100 or a third party system 120. The online system 100 also provides content items (e.g., for display on a client device 110 or electronic display 140) based on information from third party systems 120.

In some embodiments, the online system 100 is a social networking system. Users join the social networking system and add connections to other users to which they desire to be connected. At least some of these connections may be considered "friendship" type connections. Users of the social networking system may provide information about themselves, which is stored as user profiles. For example, users may provide their age, gender, geographical location, educational history, employment history and/or the like. The information provided by users may be used by the social networking system to direct information to the user. For example, the social networking system may recommend social groups, events, other social networking objects, and potential connections (e.g., friends) to a user. A social networking system may also enable users to explicitly express interest in objects and/or concepts, such as brands, products, celebrities, hobbies, sports teams, music, and the like. These interests may be used in a myriad of ways, including targeting content items and personalizing the user experience on the social networking system by showing relevant stories about other users of the social networking system based on shared interests.

In some embodiments, the social networking system maintains and stores a social graph. The social graph includes nodes connected by a set of edges. Nodes represent users and other objects of the social networking system, such as web pages embodying concepts and entities, and edges connect the nodes. Each edge represents a particular interaction or connection between two nodes, such as a user expressing an interest in a news article shared by another user. As another example, an edge may represent a connection (e.g., a friendship type relationship) established between two users. As such, the social graph includes data representative of the social signals of the social networking system. In one embodiment, the social networking system generates the edges of the social graph based on the observed actions of its users.

The client device 110 is a computing device capable of receiving user input as well as transmitting and/or receiving data via the network 130. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 130. In one embodiment, a client device 110 executes an application allowing a user of the client device 110 to interact with the online system 100 or a third party system 120. For example, a client device 110 executes a browser application to enable interaction between the client device 110 and the online system 100 via the network 130. In another embodiment, a client device 110 interacts with the online system 100 through an application programming interface (API) running on a native operating system of the client device 110, such as IOS® or ANDROID™.

In one embodiment, a third party system 120 is an application provider communicating information describing applications for execution by a client device 110 or communicating data to client devices 110 for use by an application executing on the client device 110. In other embodiments, a third party system 120 provides content or other information for presentation via a client device 110. Each third party system 120 is associated with a server outside of the domain of the online system 100. In one embodiment, the third party system 120 communicates content (e.g., a website or HTML code) from a server of the third party system 120 to a server of the online system 100. The content may be created by the entity that owns the third party system 120. Such an entity may be a company or other type of organization offering a product (e.g., a tangible object or an intangible service), or message that the company wishes to promote.

The electronic display 140 displays content items (e.g., images and/or video) to users as generated by the online system 100 or any other source of content items (e.g., a third party system 120). The electronic display 140 may comprise a single electronic display or multiple electronic displays. The electronic display 140 may display multiple content items simultaneously, e.g., a first content item on a left side display area of the electronic display 140 and a second content item on the right side display area of the electronic display 140. Examples of a display device of the electronic display 140 include: a liquid crystal display (LCD), an organic light emitting diode (OLED) display, an active-matrix organic light-emitting diode display (AMOLED), or some combination thereof. The electronic display 140 may be programmed with location data indicating a geographical location (e.g., GPS coordinates) of the electronic display 140 or any other identifier of the location of the electronic display 140 (e.g., "entrance of mall," "next to bathrooms," "checkout counter," "food court," or "waiting area"). The electronic display 140 may also include a GPS sensor to determine its location.

In some embodiments, the electronic display 140 includes other components to detect users and/or user interactions such as a touchscreen device or sensors such as a camera, a distance sensor, a wireless beacon, an audio sensor, a thermal heat sensor, etc. (not shown in FIG. 1A). For example, the touchscreen device generates user interaction data indicating finger or hand movements and gestures performed by a user interacting with the electronic display 140. Additionally, the camera may capture images of users, e.g., including the faces of users, which can be processed using image-recognition techniques to determine user information associated with the users. As another example, the wireless beacon may determine the presence of a client device 110 in vicinity of the electronic display 140 (e.g., within a threshold radius from the electronic display 140). The wireless beacon may transmit information to and/or from the client device 110 (e.g., via the network 130 or a direct communication between the client device 110 and the electronic display 140. An electronic display 140 may be associated with a third party system 120 or with the online system 100.

The network 130 includes any combination of local area and/or wide area networks, using both wired and/or wireless communication systems. In one embodiment, the network 130 uses standard communications technologies and/or protocols. For example, the network 130 includes communication links using technologies such as Ethernet, 802.11, worldwide interoperability for microwave access (Wi-MAX), 3G, 4G, code division multiple access (CDMA), digital subscriber line (DSL), etc. Examples of networking protocols used for communicating via the network 130 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 130 may be represented using any suitable format, such as hypertext markup language (HTML) or extensible markup language (XML). In some embodiments, all or some of the communication links of the network 130 may be encrypted using any suitable technique or techniques.

Figure 1B:
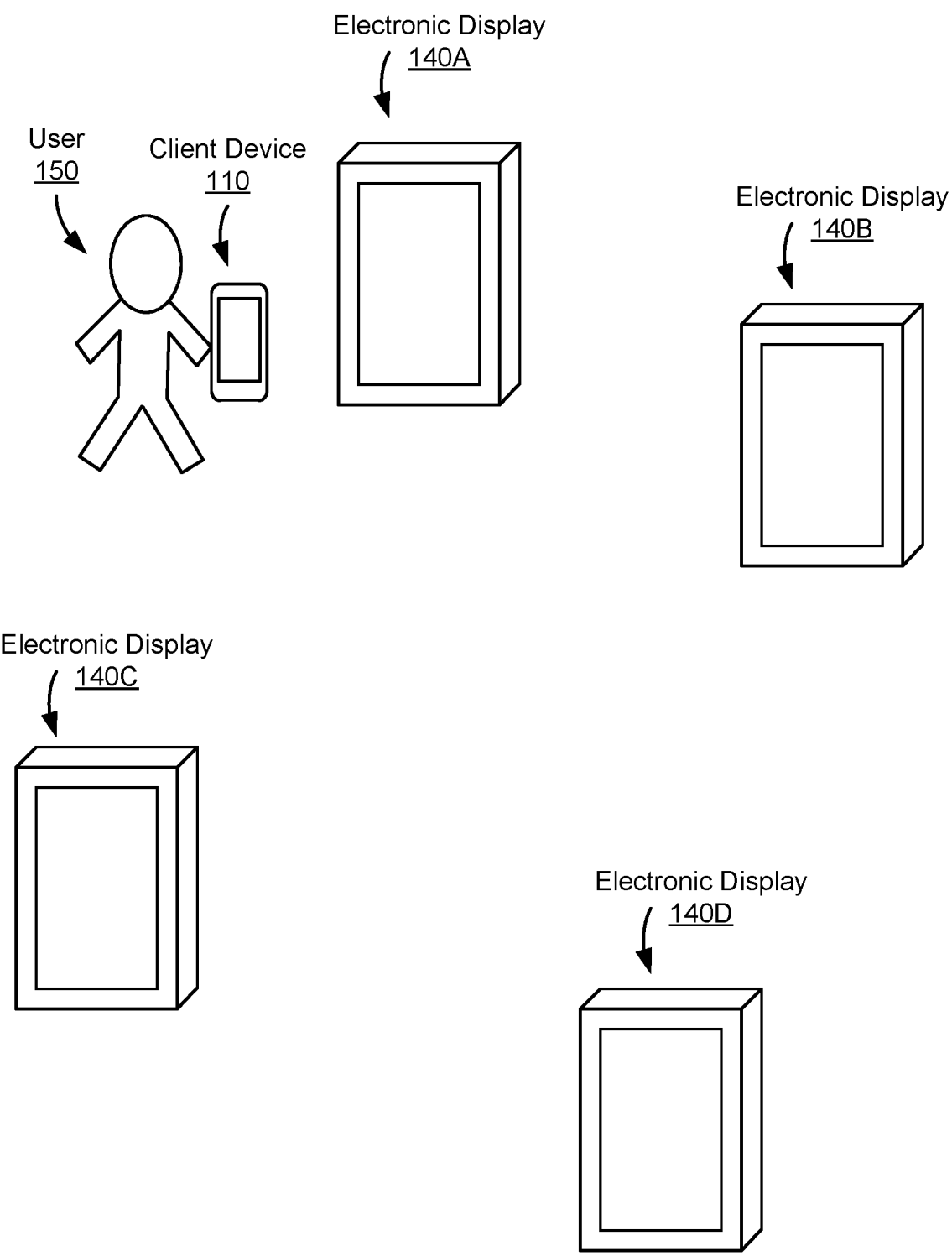
FIG. 1B is a diagram of a system environment with multiple electronic displays according to one embodiment.

FIG. 1B is a diagram of a system environment with multiple electronic displays according to one embodiment. The system environment includes four electronic displays, 140A, 140B, 140C, and 140D (which may collectively be referred to herein as "electronic displays 140" or "electronic display 140"), at different locations at a venue, e.g., a mall. As the user 150 of the client device 110 walks around the mall, the electronic displays 140 may determine if the user 150 and/or client device is in vicinity of (or interacting with) a particular electronic display 140. The particular electronic display 140 displays one or more content items that are customized to the user 150. A content item displayed on one electronic display may be based on another content item previously displayed to the user 150 on a second electronic display. The online system 100 may also provide content items for display to the client device 110 based on a content item displayed on an electronic display 140.

II. System Architecture of Online System

Figure 2:
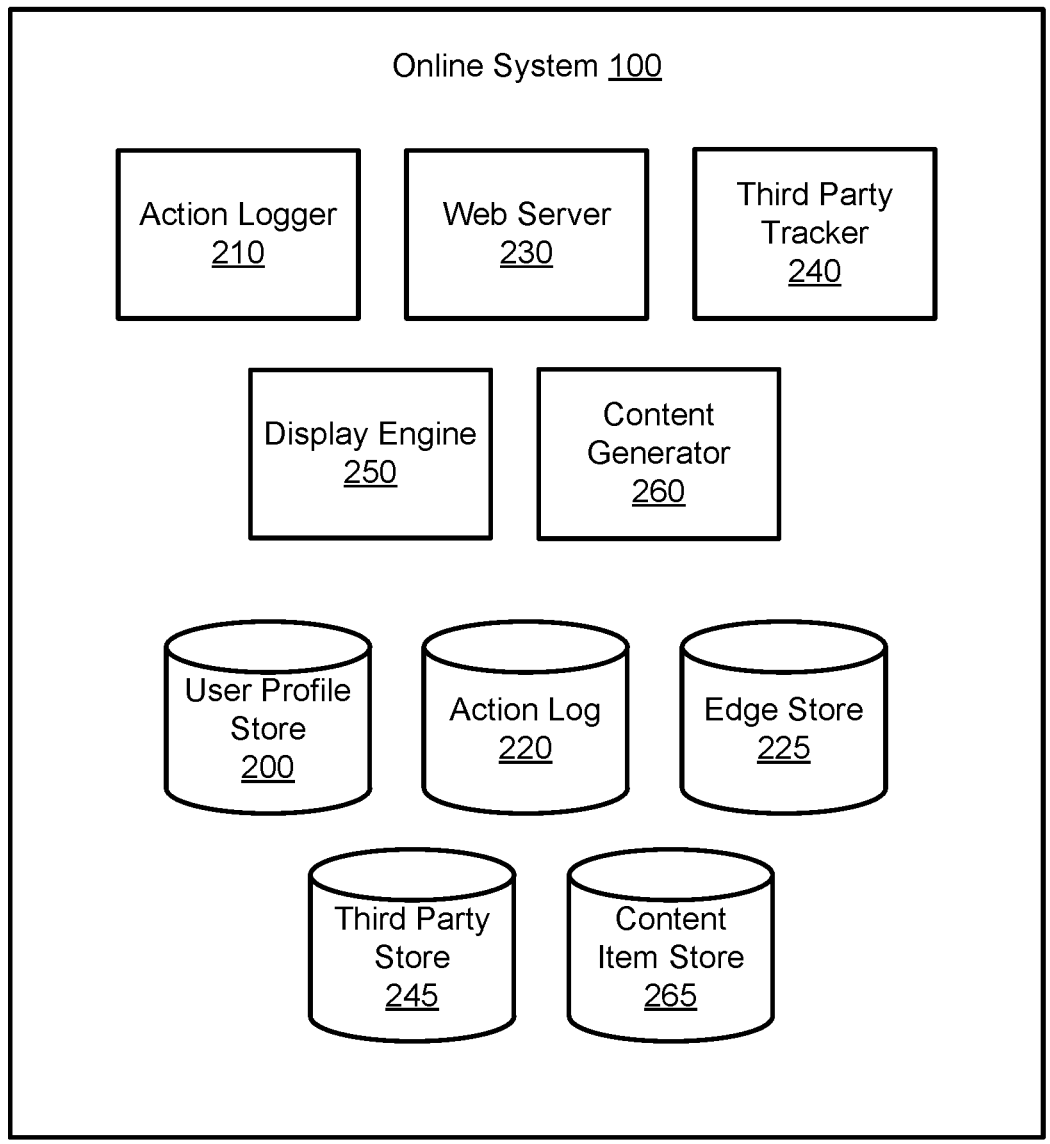
FIG. 2 is a block diagram illustrating the system architecture of an online system for customizing content for electronic displays according to one embodiment.

FIG. 2 is a block diagram illustrating the system architecture of the online system 100 for customizing content for electronic displays according to one embodiment. The online system 100 includes a user profile store 200, action logger 210, action log 220, edge store 225, web server 230, third party tracker 240, third party data store 245, display engine 250, content generator 260, and content item store 265. In other embodiments, the online system 100 may include additional, fewer, or different components for various applications. Conventional components such as network interfaces, security functions, load balancers, failover servers, management and network operations consoles, and the like are not shown so as to not obscure the details of the system architecture.

The user profile store 200 stores user profiles associated with each user of the online system 100. A user profile includes declarative information about the user that was explicitly shared by the user and may also include profile information inferred by the online system 100. In one embodiment, a user profile includes multiple data fields, each describing one or more attributes of the corresponding user of the online system 100. Examples of information stored in a user profile include biographic, demographic, and other types of descriptive information, such as work experience, educational history, gender, hobbies or preferences, location and the like.

A user profile may also store other information provided by the user, for example, images or videos. In certain embodiments, images of users may be tagged with identification information of users of the online system 100 displayed in an image. A user profile in the user profile store 200 may also maintain references to actions by the corresponding user performed on the online system 100. The user profile store 200 further stores data describing one or more relationships between different users and allows users to specify their relationships with other users. For example, these user-defined relationships allow users to generate relationships with other users that parallel the user's real-life relationships, such as friends, co-workers, partners, and the like.

The user profile store 200 can store user profiles associated with individuals, as well as user profiles associated with entities such as businesses or organizations, e.g., that own a third party system 120. This allows an entity to establish a presence on the online system 100 for connecting and exchanging content with other users of the online system 100. The entity may post information about itself, about items associated with the entity, for example, products offered by the entity, or provide other information to users of the online system 100 using a brand page associated with the entity's user profile. Users of the online system 100 may connect to the brand page to receive information posted to the brand page or to receive information from the brand page. A user profile associated with the brand page may include information about the entity itself, providing users with background or informational data about the entity.

The action logger 210 receives communications about user actions internal to and/or external to the online system 100, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the online system 100 to track user actions on the online system 100, as well as actions on third party systems 120 that communicate information to the online system 100. Users may interact with various objects on the online system 100, and the action logger 210 stores information describing these interactions in the action log 220. Examples of interactions with objects include: interacting with a content item displayed on an electronic display 140, viewing products on a brand page, commenting on posts, sharing links, and checking-in to physical locations via a mobile device, and any other interactions. Additional examples of interactions with objects on the online system 100 that are included in the action log 220 include: acquiring a product from a third party system 120, commenting on a photo album, communicating with a user, establishing a connection with an object, joining an event to a calendar, joining a group, creating an event, authorizing an application, using an application, expressing a preference for an object ("liking" the object) and engaging in a transaction.

Additionally, the action log 220 may record a user's interactions with content (e.g., sponsored or non-sponsored content) on the online system 100 as well as with other applications operating on the online system 100 or an electronic display 140. In some embodiments, data from the action log 220 is used to infer interests or preferences of a user, augmenting the interests included in the user's user profile and allowing a more complete understanding of user preferences. The action log 220 can record information about client devices 110 that a user uses to interact with the online system 100. For example, the action log 220 records whether the user used a laptop computer or smartphone client device (or an electronic display 140) to interact with the online system 100. Further, the action log 220 may include information about the types of client devices 110, e.g., smartphone running an IOS® or ANDROID™ operating system.

The action log 220 may also store user actions performed on a third party system 120, such as an external website or via an electronic display 140, and communicated to the online system 100. For example, the external website may recognize a user of an online system 100 through a social plug-in enabling the external website to identify the user of the online system 100. Since users of the online system 100 are uniquely identifiable, external websites may communicate information about a user's actions outside of the online system 100 to the online system 100 for association with the user. Hence, the action log 220 can record information about actions that users perform on a third party system 120 including webpage viewing histories, content that were engaged, acquisitions made, and other patterns from past actions. The action log 220 can also store information about user actions performed on a third party system 120 received from the third party tracker 240, which is further described below.

In one embodiment, the edge store 225 stores information describing connections between users and other objects on the online system 100 as edges. Edges may be defined by users, allowing users to specify their relationships with other users, e.g., that parallel the users' real-life relationships such as friends, co-workers, family members, etc. The action logger 210 may generate edges when users interact with objects in the online system 100, e.g., expressing interest in a page on the online system 100, sharing a link with other users of the online system 100, and commenting on posts made by other users of the online system 100.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 100, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

In one embodiment, the edge store 225 stores information about edges, such as affinity scores for objects, interests, and other users. Affinity scores, or "affinities," may be computed by the online system 100 over time to approximate a user's interest in an object or in another user in the online system 100 based on the actions performed by the user. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 200, or the user profile store 200 may access the edge store 225 to determine connections between users.

The web server 230 links the online system 100 via the network 130 to the client devices 110 and electronic displays 140. The web server 230 serves web pages, as well as other web-related content, such as JAVA®, FLASH®, XML and so forth. The web server 230 may receive and route messages between the online system 100, a client device 110, and an electronic display 140, for example, instant messages, queued messages (e.g., email), text messages, short message service (SMS) messages, or messages sent using any other suitable messaging technique. A user may send a request to the web server 230 to upload information (e.g., images or videos) that are stored in the user profile store 200. Additionally, the web server 230 may provide application programming interface (API) functionality to send data directly to native client device operating systems, such as IOS®, ANDROID™, WEBOS® or RIM®.

The third party tracker 240 receives third party information from third party systems 120 and stores the received information in the third party store 245, e.g., a computer database. The third party tracker 240 can periodically send a request for third party information to a third party system 120. The third party system 120 provides the third party information in response to receiving the request. Third party systems 120 can also provide third party information proactively to the third party tracker 240 without requiring a request. For example, a third party system 120 automatically provides third party information in response to a user acquiring a certain product or service from the third party system 120. As another example, a third party system 120 automatically provides third party information on a regular basis to the third party tracker 240, e.g., once every day, week, or month.

In one embodiment, the third party tracker 240 receives information from third party systems 120 using pixel tracking. The third party tracker 240 provides a pixel to a third party system 120 to be included in a user interface associated with the third party system 120. The third party system 120 provides third party information to the third party tracker 240 in response to a user of the online system 100 viewing the pixel of the user interface. For example, the pixel is included in a user interface displaying a website of the third party system 120, e.g., a website for a checkout process for acquiring a product or service available via the third party system 120. The user interface may be associated with an electronic display 140. When the client device 110 of the user (or the electronic display 140) displays the pixel of the website on the display screen of the client device, the third party system 120 provides third party information to the third party tracker 240 indicating that the user viewed the website. Additionally, the third party information describes the information about the product or service.

The display engine 250 transmits information to and from electronic displays 140. For instance, the display engine 250 receives user data from the electronic displays 140, e.g., identified or generated based on data from sensors of the electronic displays 140. As an example use case, the user data includes facial recognition data from a camera of an electronic display 140 that captured faces of users in vicinity of the electronic display. The online system 100 identifies a user of the online system 100 corresponding to the facial recognition data, for instance, by matching the facial recognition data with images of users from the user profile store 200. As another example, the user data includes a universally unique identifier (UUID) of a client device 110, or any other suitable identifying information of a client device associated with a user. The online system 100 identifies a user of the online system 100 corresponding to the UUID based on information from the action log 220 indicating a UUID of a client device that the user previously used to login to, or interact with, the online system 100.

In one embodiment, the display engine 250 aggregates information about a population of users. For example, the display engine 250 receives user data for each user of a population of users located in vicinity of an electronic display 140, e.g., within a certain distance from the electronic display 140 during a given duration of time (e.g., the last five minutes). The display engine 250 determines demographic data of based on the aggregate user data. For instance, the demographic data indicates the average age of the population of users, socioeconomic information, the ratio of males-to-females in the population, or common characteristics between users of the population (e.g., brands that several of the users liked, events or locations that the users visited, or topics of content items that the users frequently view or interact with).

The display engine 250 may also receive location data from an electronic display 140 indicating a geographical location of the electronic display 140. The display engine 250 provides content items for display to electronic displays 140. The content items are generated and/or selected by the content generator 260, which is further described below. Further, the display engine 250 may receive interaction data indicating one or more interactions performed by a user on a content item displayed on an electronic display 140. In one embodiment, the display engine 250 provides information to an electronic display 140 instructing the electronic display 140 to modify a content item being displayed on the electronic display 140.

The content generator 260 provides content items for presentation to users of the online system 100. The content generator 260 may generate content items and store the content items in the content item store 265. The content generator 260 may also retrieve previously generated content items from the content item store 265 and/or any other source of content items accessible to the online system 100. The content generator 260 can analyze information stored in the user profile store 200 or action log 220 to identify information useful for generating content items. The content generator 260 may also obtain information from other run time modules that implement functionality for performing different types of actions. For example, if a user views a brand page of a third party system 120, the module executing the code for displaying the brand page to the user informs the content generator 260 of the action so that the content generator 260 can generate a content item describing the action.

The content item store 265 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content item store 265, such as status updates, photos tagged by users to be associated with other objects in the online system 100, events, groups or applications. In some embodiments, objects are received from third-party applications or third party systems 120. Users of the online system 100 are encouraged to communicate with each other by posting text and content items of various types of media to the online system 100 through various communication channels. This increases the amount of interaction of users with each other and increases the frequency with which users interact within the online system 100.

In some embodiments, one or more content items included in the content item store 265 include content for presentation to a user and a corresponding amount of compensation. The content is text, image, audio, video, or any other suitable data presented to a user, and may include sponsored content from a third party system 120. In various embodiments, the content also specifies a page of content. For example, a content item includes a landing page specifying a network address of a page of content to which a user is directed when the content item is accessed. In some embodiments, the amount of compensation is provided by a third party system 120 (associated with the corresponding content item) to the online system 100 if content in the content item is presented to a user, if the content in the content item receives a user interaction when presented, or if any suitable condition is satisfied when content in the content item is presented to a user. In an example, the expected value to the online system 100 of presenting a content item may be determined by multiplying the amount of compensation by a probability of a user interacting with the content item.

In some embodiments, a content item may include one or more targeting criteria specified by the user who provided the content item to the online system 100. These targeting criteria may also be received from the third party system 120. The targeting criteria specify one or more characteristics of users eligible to be presented with the corresponding content item. For example, targeting criteria are used to identify users having user profile information, edges, or actions satisfying at least one of the targeting criteria. Hence, targeting criteria allow a user to identify users having specific characteristics, simplifying subsequent distribution of content to different users. In various embodiments, the content item store 265 includes multiple campaigns, which each include one or more content items, such as a sponsored content item. In various embodiments, a campaign in associated with one or more characteristics that are attributed to each content item of the campaign. For example, an amount of compensation is associated with a campaign is also associated with each content item of the campaign. Similarly, an objective associated with a campaign is also associated with each content item of the campaign.

In one embodiment, targeting criteria may specify actions or types of connections between a user and another user or object of the online system 100. Targeting criteria may also specify interactions between a user and objects performed external to the online system 100, such as on a third party system 120. For example, targeting criteria identifies users that have taken a particular action, such as sent a message to another user, used an application, joined a group, left a group, joined an event, generated an event description, acquired or reviewed a product or service, requested information from a third party system 120, installed an application, or performed any other suitable action. Including actions in targeting criteria allows users to further refine users eligible to be presented with content items. As another example, targeting criteria identifies users having a connection to another user or object or having a particular type of connection to another user or object.

The content generator 260 provides a series of content items for display, in one embodiment. The content generator 260 may provide each content item of the series based on a schedule. For example, at a first time in the schedule, the content generator 260 provides a first content item of the series for display to a target user on an electronic display 140 and/or client device 110. At a second time in the schedule, the content generator 260 provides a second content item of the series for display to the target user on the electronic display 140.

In some embodiments, the content generator 260 generates content items based on information provided by a third party system 120 and/or selects content items provided by a third party system 120. The content generator 260 can modify existing content items or generate new content items based on one or more previously presented content items. For example, the online system 100 receives information indicating that a target user interacted with a content item describing a product available via a third party system 120. The content generator 260 provides a subsequent content item for display to the target user that describes additional information about the product or that describes a similar product available via the third party system 120 (or via a different third party system 120).

III. Example Customized Content on Electronic Displays

Figure 3A:
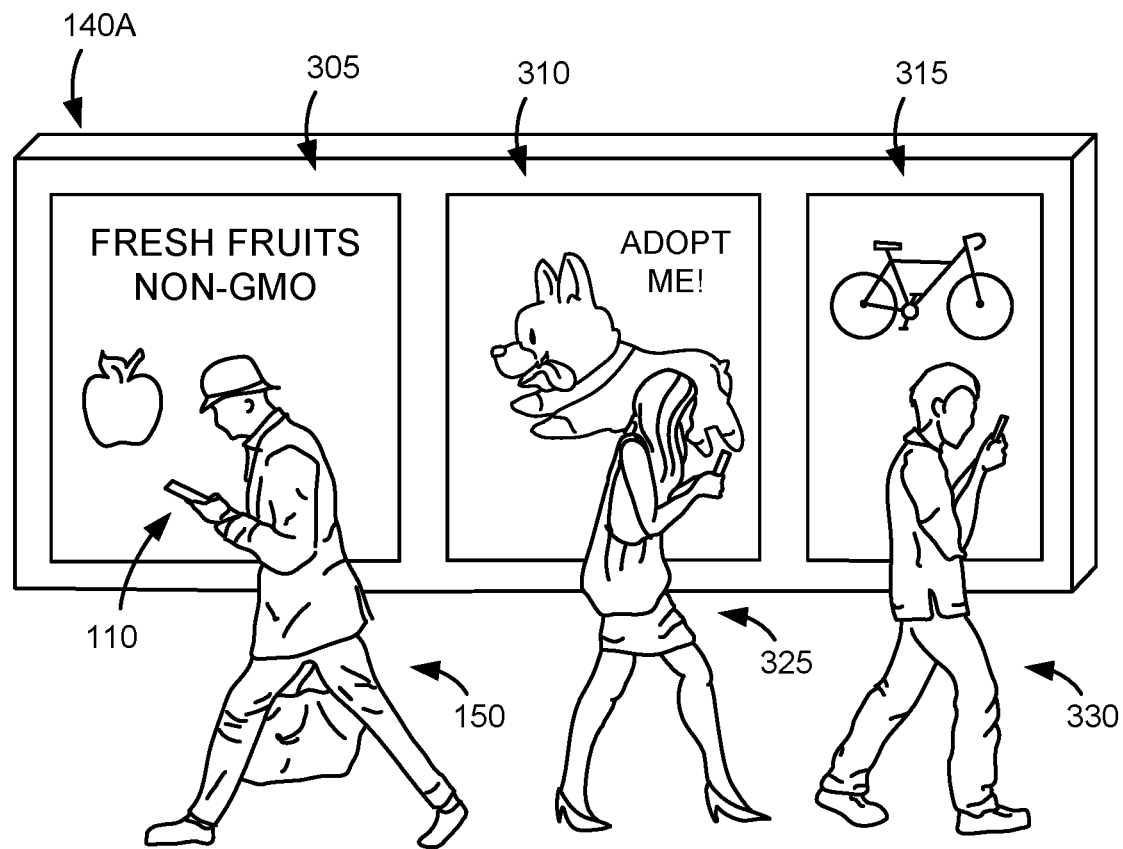
FIG. 3A is a diagram illustrating users with client devices in vicinity of an electronic display according to one embodiment.

FIG. 3A is a diagram illustrating users with client devices in vicinity of the electronic display 140A according to one embodiment. The electronic display 140A displays three different content items 305, 310, and 315 each on a different display area of the electronic display 140A. The content items 305, 310, and 315 are customized to the three users 150, 325, and 330, respectively. For example, the electronic display 140A provides user data of each of the three users to the online system 100. Based on the user data, the online system 100 (e.g., via the third party tracker 240) determines that the user 150 previously visited a brand page of a third party system 120 that provides fruits, including fruits that are non-genetically modified organisms (GMO). Thus, the content generator 260 determines that there is a high likelihood that the user 150 will be interested in the fruits. Accordingly, the display engine 250 provides the content item 305 (e.g., associated with the third party system 120) including the text "Fresh Fruits Non-GMO" and an image of an apple for display on the electronic display 140A. The electronic display 140A displays the content item 305 in a display area adjacent to the user 150.

Additionally, the online system 100 (e.g., via the action logger 210) also determines that the user 325 commented on content items associated with pet dogs based on the user data. Thus, the content generator 260 determines that the user 325 may be interested in adopting a pet dog. Accordingly, the display engine 250 provides the content item 310 including an image of a dog and the text "Adopt Me!" for display on the electronic display 140A. The electronic display 140A displays the content item 310 in a display area (e.g., different than the display area showing the content item 305) adjacent to the user 325.

Furthermore, based on the user data, the online system 100 (e.g., using the user profile store 200) also identifies a user profile associated with the user 330. The online system 100 identifies user profiles associated with friends of the user 330, for instance, based on edges in the edge store 225 representing friendship connections between users of the online system 100. The online system 100 determines that several friends of the user 330 recently acquired a bicycle from a third party system 120 (different than the third party system 120 that provides fruits as described above). Thus, the content generator 260 determines that the user 330 may also be interested in acquiring a bicycle from the third party system 120. Accordingly, the display engine 250 provides the content item 315 including an image of the bicycle for display on the electronic display 140A. The electronic display 140A displays the content item 315 in a display area (e.g., different than the display areas showing the content items 305 and 310) adjacent to the user 330.

Though the electronic display 140A displays three different content items each customized to a given user in the example shown in FIG. 3A, in other embodiments, the electronic display 140A may display content items customized based on aggregate user data of multiple users. For example, the online system 100 determines that the users 150 and 330 are both males in the 20 to 30 year old age range. Thus, the content generator 260 may select a content item for display on the electronic display 140A that is likely to be popular among 20 to 30 year old male users, for instance, based on analyzing actions performed by other 20 to 30 year old male users on the online system 100.

Figure 3B:
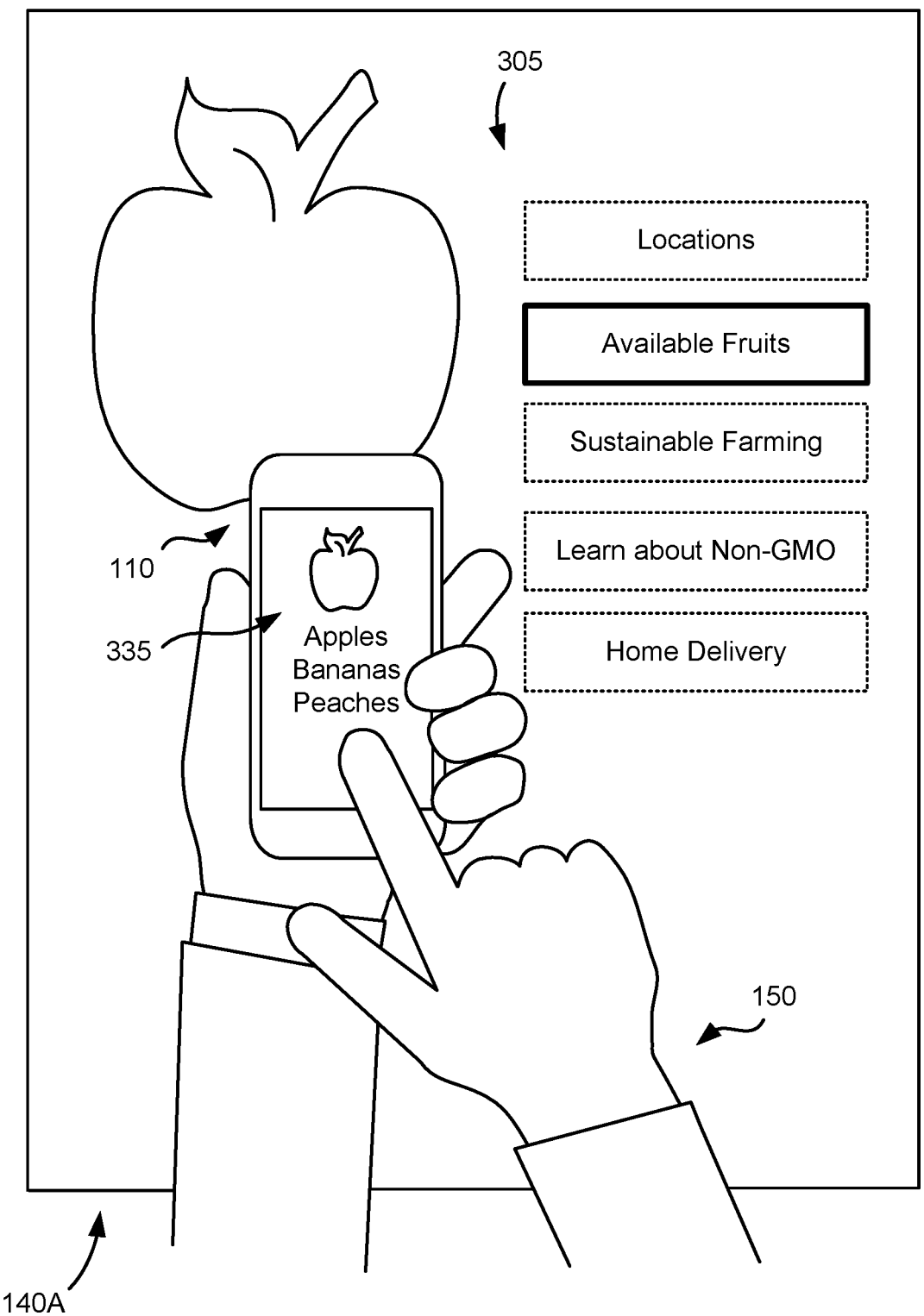
FIG. 3B is a diagram illustrating a user interacting with the electronic display shown in FIG. 3A according to one embodiment.

FIG. 3B is a diagram illustrating the user 150 interacting with the electronic display 140A shown in FIG. 3A according to one embodiment. In an example use case, the electronic display 140A receives interaction data indicating that the user 150 touched the electronic display 140A, e.g., based on sensor data from a touchscreen device of the electronic display 140A. In response to the interaction data, the electronic display 140A displays a list of options to the user 150, for instance, by modifying the display area showing the content item 305. The electronic display 140A receives additional interaction data indicating that the user 150 selected the option "available fruits." The electronic display 140A provides the user's selection to the online system 100. The content generator 260 provides a related content item 335 to the client device 110 for display to the user 150 based on the selection. In particular, the content item 335 displayed on the client device 110 shows that the fruits available via the third party system 120 include "apples," "bananas," and "peaches." The client device 110 receives interaction data indicating that the user 150 selected the "bananas" option of the content item 335. Based on this selection, the online system 100 may provide additional details describing bananas available via the third party system 120.

Figure 3C:
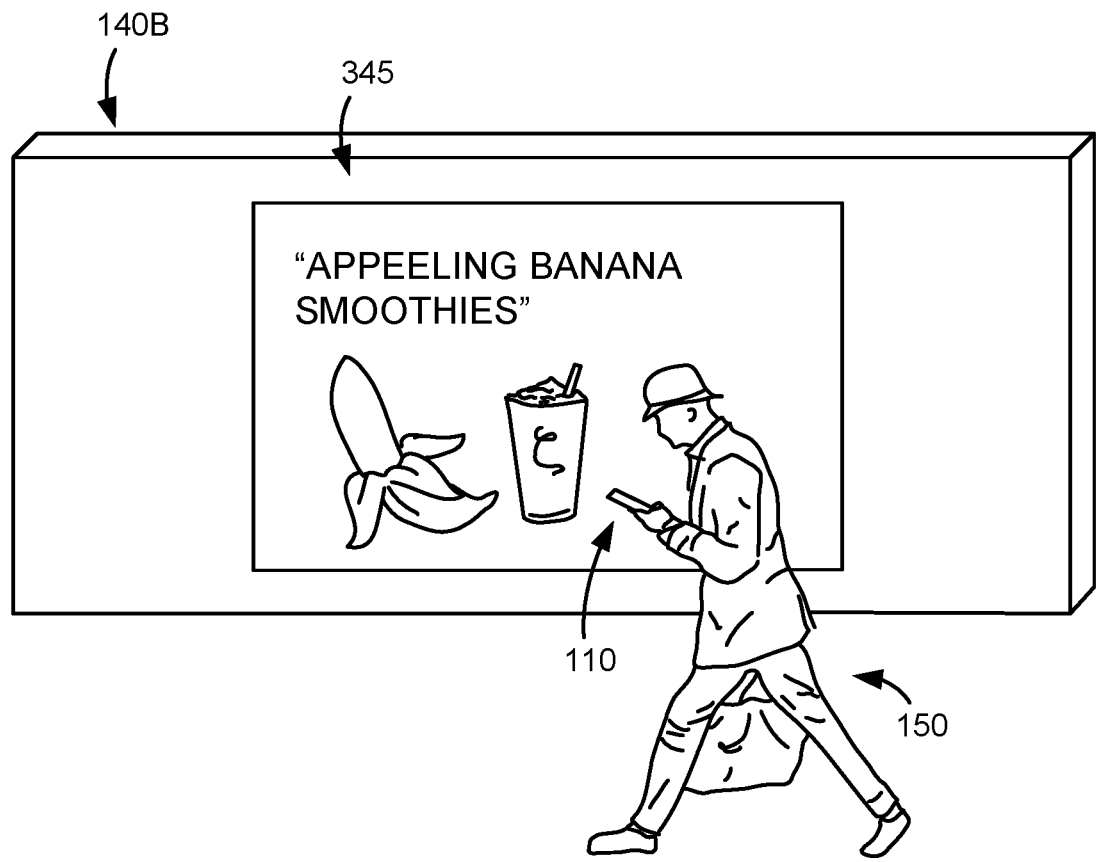
FIG. 3C is a diagram illustrating the user in vicinity of a different electronic display according to one embodiment.

FIG. 3C is a diagram illustrating the user 150 in vicinity of a different electronic display 140B according to one embodiment. For instance, the user 150 walks to the vicinity of the electronic display 140B after interacting with the electronic display 140A shown in FIGS. 3A-B. Based on the user's selection of the "bananas" option of the content item 335 shown in FIG. 3B, the online system 100 determines that the user 150 is likely interested in consumable goods (e.g., food and drinks) that include bananas. Thus, the content generator 260 generates a content item 345 including the text "appeeling banana smoothies" and images of a banana and a smoothie. The display engine 250 provides the content item 345 to the electronic display 140B for display to the user 150. The content item 345 may be associated with the same third party system 120 that provides the fruits shown in the content items 305 and 335 shown in FIG. 3B. Alternatively, the content item 345 may be associated with a different third party system 120, for example, a café that the user 150 recently visits, or based on geographical location check-ins performed by the user 150 on the online system 100.

Figure 3D:
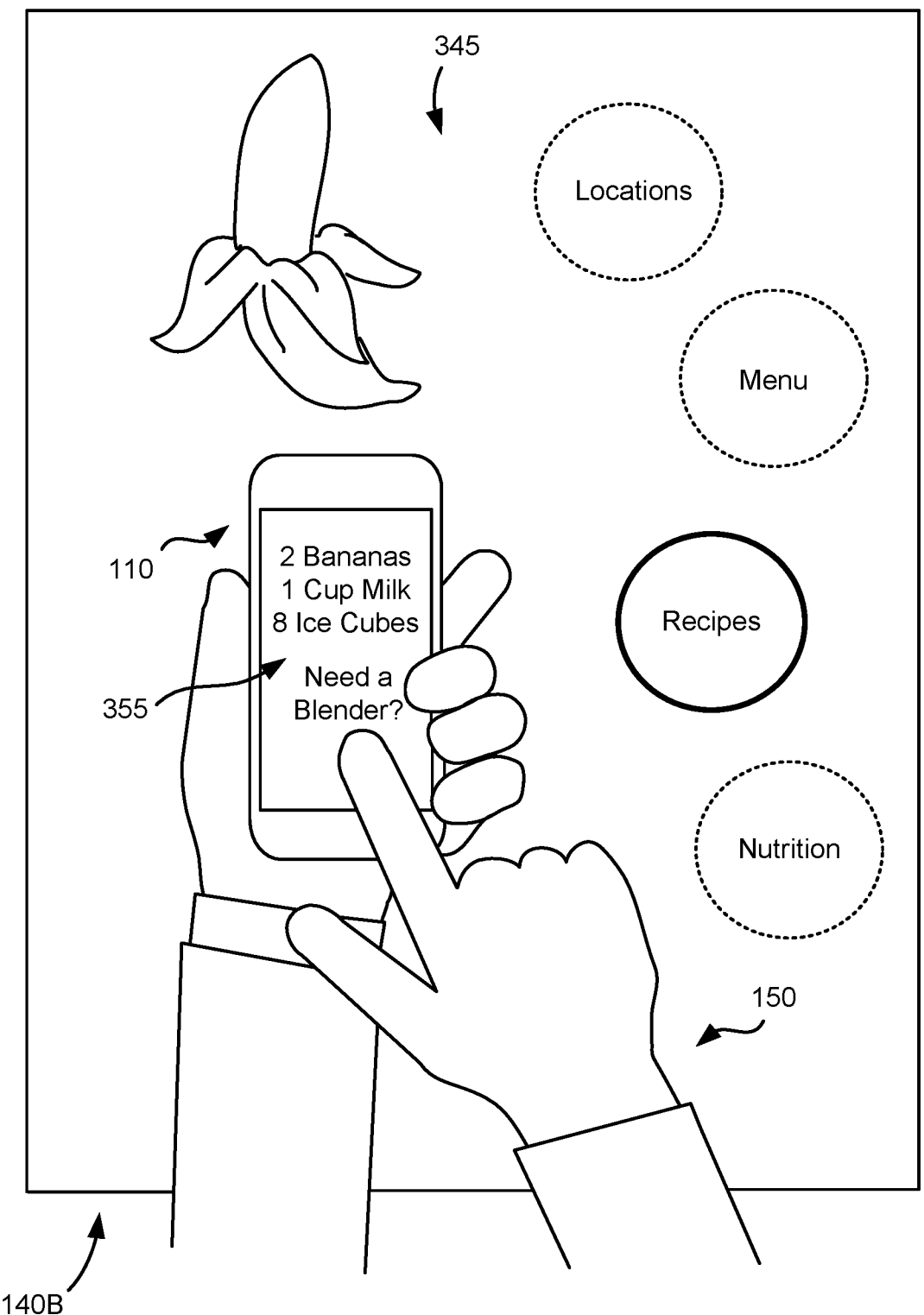
FIG. 3D is a diagram illustrating the user interacting with the different electronic display shown in FIG. 3C according to one embodiment.

FIG. 3D is a diagram illustrating the user 150 interacting with the different electronic display 140B shown in FIG. 3C according to one embodiment. The electronic display 140B receives interaction data indicating, for example, the presence of the user 150 in vicinity of the electronic display 140B (e.g., based on data from a sensor of the electronic display 140B). In response to the interaction data, the electronic display 140B displays a list of options to the user 150, for instance, by modifying the display area showing the content item 345. The electronic display 140B receives additional interaction data indicating that the user 150 selected the option "recipes." The electronic display 140B provides the user's selection to the online system 100. The content generator 260 provides a related content item 355 to the client device 110 for display to the user 150 based on the selection. In particular, the content item 355 displayed on the client device 110 shows an ingredient list for a banana smoothie recipe. In addition, the content item 355 may also include sponsored content. For instance, the question "Need a Blender?" included in the content item 355 has a universal resource locator (URL) associated with a website of another third party system 120 that provides blenders (which can be used to make banana smoothies).

The examples illustrated in FIGS. 3A-D show that the online system 100 provides a user experience that is customized to a user 150 by displaying certain content items on electronic displays 140 and a client device 110 of the user 150. The online system 100 selects/generates and provides content items for display that are likely to be of interest to the user 150. Based on the interactions of the user 150, the online system 100 may modify a currently displayed content item by showing more information in a display area of an electronic display 140 displaying the content item, or provide additional content items for display to the user 150.

Since subsequent content items may be selected or generated based on previously displayed content items or interactions of the user 150, the user 150 is more likely to interact with the subsequent content items. Further, the electronic displays 140A and 140B may provide different content items customized based on the specific user (or users) in vicinity of the electronic displays. For instance, the electronic display 140B provides a content item including information of local veterinarians to the user 325 (e.g., who is likely interested in adopting a dog) and provides a content item including information about local biking paths to the user 330 (e.g., who is likely interested in acquiring a new bicycle).

Though the examples illustrated in FIGS. 3A-D describe fruits and smoothie recipes available via third party systems 120, it should be noted that in other embodiments, the electronic displays 140 may customize other types of content items for display to users of the online system 100. For example, electronic displays 140 at an airport provide content items including flight departure/arrival details and other itinerary information customized for a user traveling through the airport. As another example, electronic displays 140 at a movie theater provide content items describing movies that a particular user is likely to be interested in watching based on the particular user's past actions on the online system 100. Further, an electronic display 140 at the movie theater may provide content items of currently playing movies when a user is entering the movie theater and provide content items of movies that will be released in the near future when the user is exiting the movie theater. The movie theater may include a first electronic display located near the entrance of the theater and a second electronic display located near the exit of the theater. Thus, the online system 100 can provide content items for display on the electronic display 140 based on temporal data (e.g., a series of content items that form a storyline or narrative) and/or geographical location data to convey a message to a user.

IV. Example Process Flow

Figure 4:
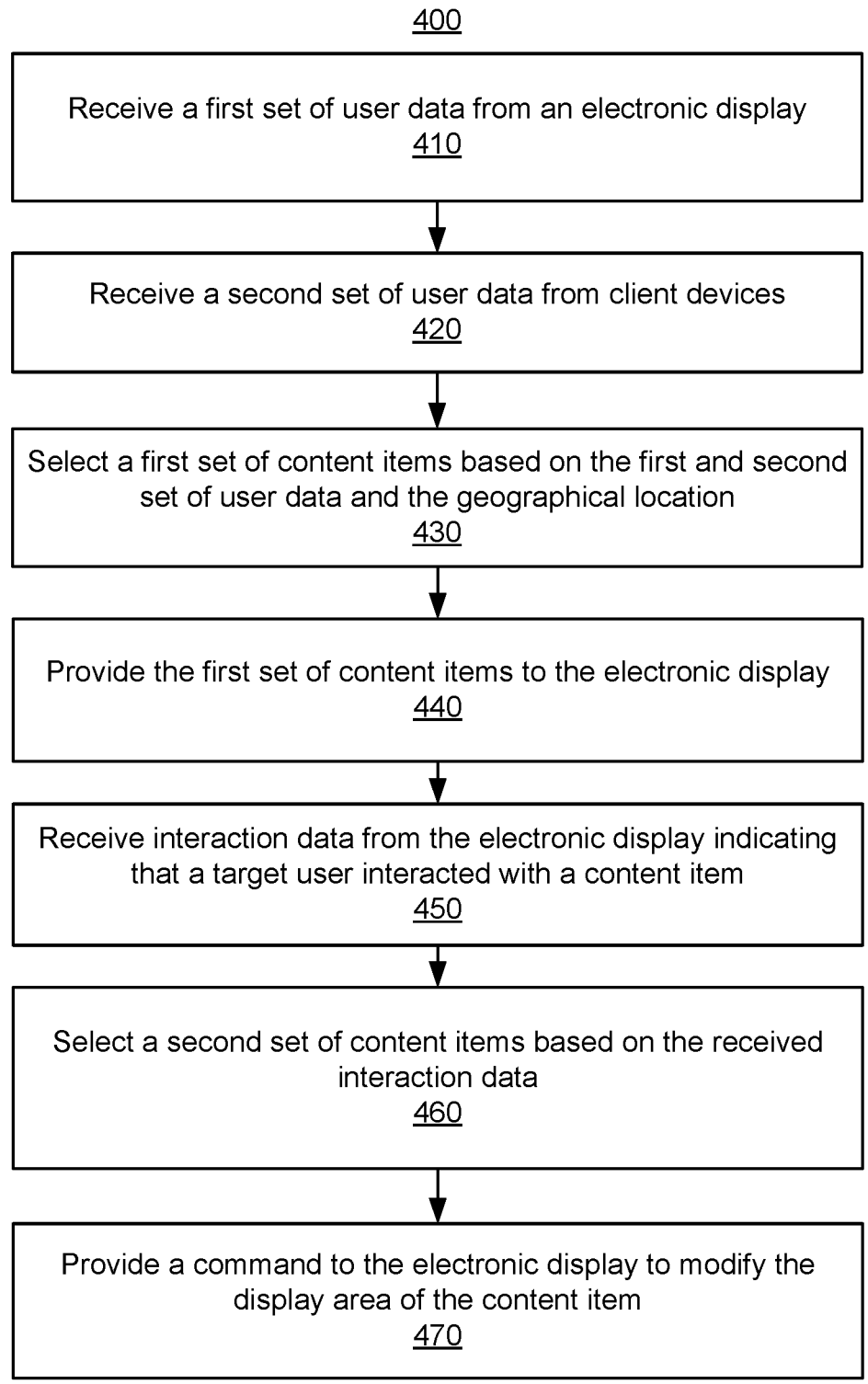
FIG. 4 is a flowchart illustrating a process for customizing content for electronic displays according to one embodiment.

FIG. 4 is a flowchart illustrating a process 400 for customizing content for electronic displays according to one embodiment. In some embodiments, the process 400 is performed by the online system 100—e.g., modules of the online system 100 described with reference to FIG. 2—within the system environment in FIG. 1A. The process 400 may include different or additional steps than those described in conjunction with FIG. 4 in some embodiments or perform steps in different orders than the order described in conjunction with FIG. 4.

In one embodiment, the display engine 250 receives 410 a first set of user data from an electronic display 140 located at geographical region. The first set of user data describes users of the online system 100 who each have a client device 110. The online system 100 receives 420 a second set of user data from at least one of the client devices 110. The second set of user data includes information associated with a target user. The content generator 260 selects 430 a first set of one or more content items based on the first set of user data, the second set of user data, and the geographical location. In some embodiments, the online system 100 does not necessarily need to receive the second set of user data for the content generator 260 to select content items.

The display engine 250 provides 440 the first set of one or more content items to the electronic display 140 for display. The electronic display 140 displays each of the first set of content items in a display area of the electronic display 140. The display engine 250 receives 450 interaction data from the electronic display 140 indicating that the target user interacted with a content item of the first set of one or more content items. The content generator 260 selects 460 a second set of one or more content items based on the received interaction data. The display engine 250 provides 470 a command to the electronic display 140 to modify the display area of the electronic display 140 according to the command. The modified display area of the electronic display 140 displays the second set of one or more content items.

In one embodiment, the online system 100 also provides information about the content item for display on the client device 110 of the target user in response to receiving the interaction data from the electronic display 140. In one embodiment, the display engine 250 receives a third set of user data from a second electronic display at another geographical location. For instance, the target user walked from the electronic display 140 to the second electronic display, and the target user interacted with the second electronic display. The content generator 260 selects a subsequent content item based on the third set of user data, and the display engine 250 provides the subsequent content item to the second electronic display for display to the target user.

V. Alternative Embodiments

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable non-transitory medium containing computer program code, which can be executed by a computer processor for performing any or all of the steps, operations, or processes described.

Embodiments of the invention may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer program product comprising a non-transitory computer readable storage medium having instructions encoded thereon that, when executed by a processor, cause the processor to:
couple, by an electronic display content system via an application programming interface (API) of a social networking system separate from the electronic display content system, to the social networking system, the social networking system associated with a plurality of users, each associated with a user account, and configured to track, for each user of the plurality of users, interactions by the user with content displayed within the social networking system and store the tracked interactions in association with the associated user account, wherein the tracked interactions comprise one or more of commenting on the content, liking the content, sharing the content, and purchasing the content;
receive, by the electronic display content system from a first electronic display different from the electronic display content system and the social networking system, a first set of user data identifying a target user of the plurality of users, the target user having a client device different from the first electronic display;
access, by the electronic display content system via the API of the social networking system, first interaction data describing the interactions of the target user tracked by the social networking system with content displayed within the social networking system;
select, by the electronic display content system, a first set of one or more content items based at least in part on the first interaction data and on the geographical location of the first electronic display;
provide, by the electronic display content system, the first set of one or more content items to the first electronic display, the first electronic display displaying each content item of the first set of one or more content items in a display area of the first electronic display;
receive, by the electronic display content system, physical interaction data by the target user from the first electronic display indicating that the target user physically interacted with a content item of the first set of one or more content items displayed by the first electronic display;
provide, by the electronic display content system to the social networking system, the physical interaction data, the social networking system configured to modify content displayed by the client device of the target user based on the provided physical interaction data;
select, by the electronic display content system, a second set of one or more content items for the target user based on the physical interaction data; and
provide, by the electronic display content system, a command to the first electronic display to modify the display area of the first electronic display according to the command, the modified display area of the first electronic display displaying the second set of one or more content items.

2. The non-transitory computer readable storage medium of claim 1, having further instructions that when executed by the processor cause the processor to:
receive, by the electronic display content system, second interaction data from the first electronic display indicating that the target user interacted with a content item of the first set of one or more content items displayed by the electronic display;
select, by the electronic display content system, a subsequent set of content items based on the second interaction data; and
provide, by the electronic display content system, the subsequent set of content items to the first electronic display for display to the target user.

3. The non-transitory computer readable storage medium of claim 2, wherein selecting the subsequent set of content items is further based on at least one of the physical interaction data and the content item.

4. The non-transitory computer readable storage medium of claim 1, having further instructions that when executed by the processor cause the processor to:
provide, by the electronic display content system, in response to receiving the physical interaction data from the first electronic display, information about the content item for display on the client device of the target user.

5. The non-transitory computer readable storage medium of claim 1, having further instructions that when executed by the processor cause the processor to:
identify a plurality of user accounts of the social networking system each associated with a user of the plurality of users based on the first set of user data.

6. The non-transitory computer readable storage medium of claim 5, having further instructions that when executed by the processor cause the processor to:
determine a plurality of actions associated with the plurality of user accounts, the plurality of actions each performed by one of the plurality of users on the social networking system; and
wherein selecting the first set of one or more content items is further based on at least one of the plurality of actions.

7. The non-transitory computer readable storage medium of claim 5, having further instructions that when executed by the processor cause the processor to:
identify user accounts of a second plurality of users of the social networking system each connected to at least one of the plurality of user accounts on the social networking system; and
wherein selecting the first set of one or more content items is further based on actions performed by at least one of the second plurality of users of the social networking system.

8. The non-transitory computer readable storage medium of claim 1, wherein the first set of user data includes facial data generated based on one or more images of the plurality of users captured by a camera of the first electronic display, and having further instructions that when executed by the processor cause the processor to:
determine demographic data of the plurality of users based on the facial data; and
wherein selecting the first set of one or more content items is further based on the demographic data.

9. The non-transitory computer readable storage medium of claim 1, wherein the physical interaction data is generated by a touchscreen device of the first electronic display, and wherein the physical interaction data describes at least one gesture performed by the target user by touching the first electronic display.

10. A method comprising:
coupling, by an electronic display content system via an application programming interface (API) of a social networking system separate from the electronic display content system, to the social networking system, the social networking system associated with a plurality of users, each associated with a user account, and configured to track, for each user of the plurality of users, interactions by the user with content displayed within the social networking system and store the tracked interactions in association with the associated user account, wherein the tracked interactions comprise one or more of commenting on the content, liking the content, sharing the content, and purchasing the content;
receiving, by the electronic display content system from a first electronic display different from the electronic display content system and the social networking system, a first set of user data identifying a target user of the plurality of users, the target user having a client device different from the first electronic display;
accessing, by the electronic display content system via the API of the social networking system, first interaction data describing the interactions of the target user tracked by the social networking system with content displayed within the social networking system;
selecting, by the electronic display content system, a first set of one or more content items based at least in part on the first interaction data and on the geographical location of the first electronic display;
providing, by the electronic display content system, the first set of one or more content items to the first electronic display, the first electronic display displaying each content item of the first set of one or more content items in a display area of the first electronic display;
receiving, by the electronic display content system, physical interaction data by the target user from the first electronic display indicating that the target user physically interacted with a content item of the first set of one or more content items displayed by the first electronic display;
providing, by the electronic display content system to the social networking system, the physical interaction data, the social networking system configured to modify content displayed by the client device of the target user based on the provided physical interaction data;
selecting, by the electronic display content system, a second set of one or more content items for the target user based on the physical interaction data; and
providing, by the electronic display content system, a command to the first electronic display to modify the display area of the first electronic display according to the command, the modified display area of the first electronic display displaying the second set of one or more content items.

11. The method of claim 10, further comprising:
receiving, by the electronic display content system, second interaction data from the first electronic display indicating that the target user interacted with a content item of the first set of one or more content items displayed by the electronic display;
selecting, by the electronic display content system, a subsequent set of content items based on the second interaction data; and
providing, by the electronic display content system, the subsequent set of content items to the first electronic display for display to the target user.

12. The method of claim 11, wherein selecting the subsequent set of content items is further based on at least one of the physical interaction data and the content item.

13. The method of claim 10, further comprising providing, by the electronic display content system, in response to receiving the physical interaction data from the first electronic display, information about the content item for display on the client device of the target user.

14. The method of claim 10, further comprising identifying a plurality of user accounts of the social networking system each associated with a user of the plurality of users based on the first set of user data.

15. The method of claim 14, further comprising:
determining a plurality of actions associated with the plurality of user accounts, the plurality of actions each performed by one of the plurality of users on the social networking system; and
wherein selecting the first set of one or more content items is further based on at least one of the plurality of actions.

16. The method of claim 14, further comprising:
identifying user accounts of a second plurality of users of the social networking system each connected to at least one of the plurality of user accounts on the social networking system; and
wherein selecting the first set of one or more content items is further based on actions performed by at least one of the second plurality of users of the social networking system.

17. The method of claim 10, wherein the first set of user data includes facial data generated based on one or more images of the plurality of users captured by a camera of the first electronic display, and further comprising:
determining demographic data of the plurality of users based on the facial data; and
wherein selecting the first set of one or more content items is further based on the demographic data.

18. The method of claim 10, wherein the physical interaction data is generated by a touchscreen device of the first electronic display, and wherein the physical interaction data describes at least one gesture performed by the target user by touching the first electronic display.

19. A method comprising:
coupling, by an electronic display content system via an application programming interface (API) of a social networking system separate from the electronic display content system, to the social networking system, the social networking system associated with a plurality of users, each associated with a user account, and configured to track, for each user of the plurality of users, interactions by the user with content displayed within the social networking system and store the tracked interactions in association with the associated user account, wherein the tracked interactions comprise one or more of commenting on the content, liking the content, sharing the content, and purchasing the content;
receiving, by the electronic display content system from a first electronic display different from the electronic display content system and the social networking system, a first set of user data identifying a target user of the plurality of users, the target user having a client device different from the first electronic display;

accessing, by the electronic display content system via the API of the social networking system, first interaction data describing the interactions of the target user tracked by the social networking system with content displayed within the social networking system;

selecting, by the electronic display content system, one or more content items based on the first interaction data and on the geographical location of the first electronic display;

providing, by the electronic display content system, the one or more content items to the first electronic display, the first electronic display displaying each content item of the one or more content items in a display area of the first electronic display;

receiving, by the electronic display content system, physical interaction data by the target user from the first electronic display indicating that a target user physically interacted with a content item of the one or more content items displayed by the first electronic display;

providing, by the electronic display content system to the social networking system, the physical interaction data, the social networking system configured to modify content displayed by the client device of the target user based on the provided physical interaction data; and in response to receiving the interaction data from the electronic display:
  selecting, by the electronic display content system, an additional content item for the target user based on the physical interaction data;

providing, by the electronic display content system, a command to the electronic display to modify the display area of the electronic display according to the command, the modified display area of the first electronic display displaying the additional content item; and providing, by the electronic display content system, information about the content item for display on the client device of the target user.

20. The method of claim 19, further comprising:

receiving, by the electronic display content system from a first electronic display different from the electronic display content system and the social networking system, information identifying a target user of the plurality of users, the target user having a client device different from the first electronic display;

receiving, by the electronic display content system, second interaction data from the first electronic display indicating that a target user interacted with a content item of the one or more content items displayed by the first electronic display; and selecting, by the electronic display content system, a subsequent content item based on the second interaction data; and providing, by the electronic display content system, the subsequent content item to the second electronic display for display to the target user.

* * * * *